Figure 1:
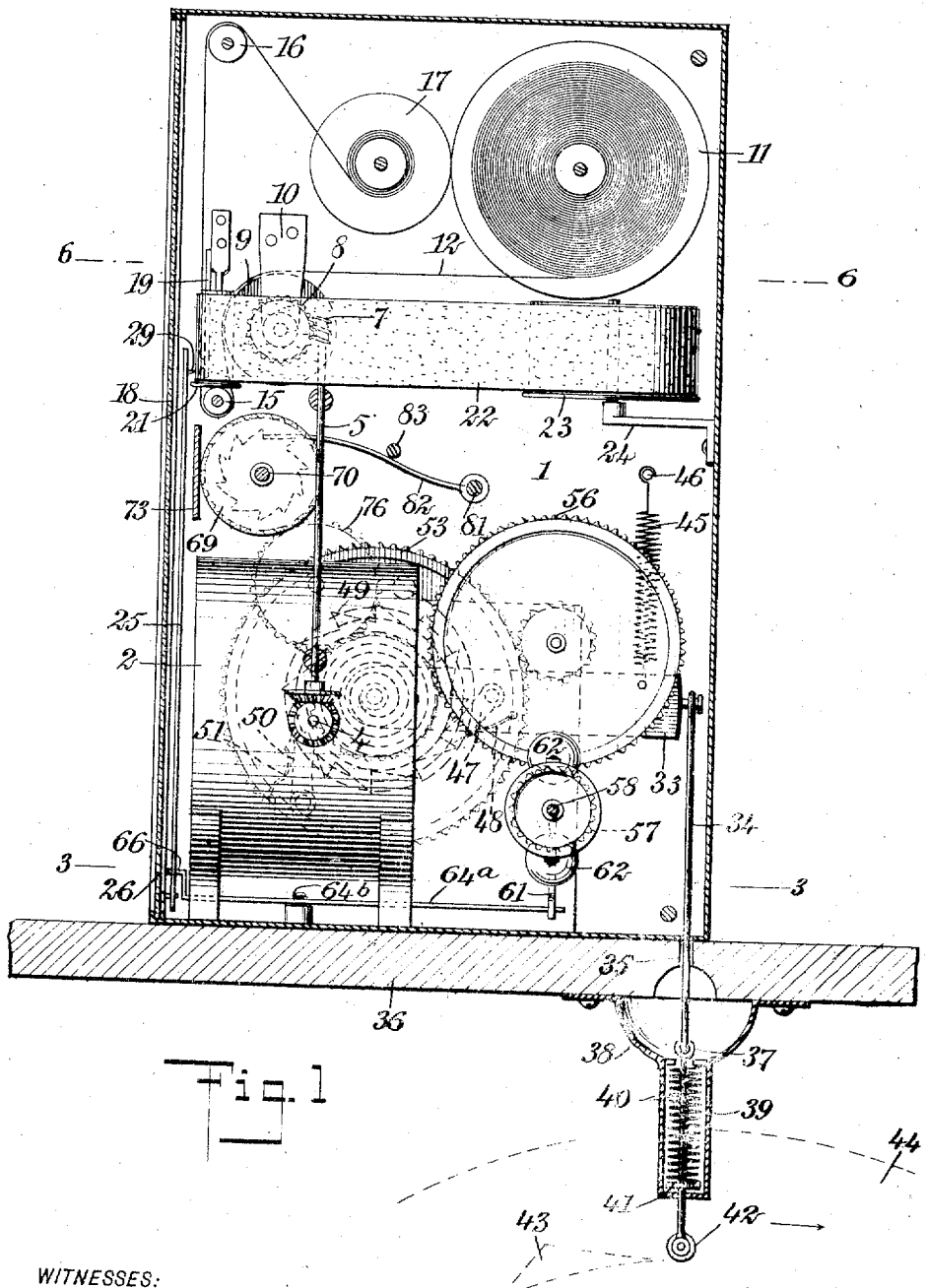

No. 859,673. PATENTED JULY 9, 1907.
G. LENNOX & R. STOTT.
SPEED RECORDER.
APPLICATION FILED APR. 11, 1906.

3 SHEETS—SHEET 1.

WITNESSES:

INVENTORS
George Lennox
Robert Stott
BY
ATTORNEYS

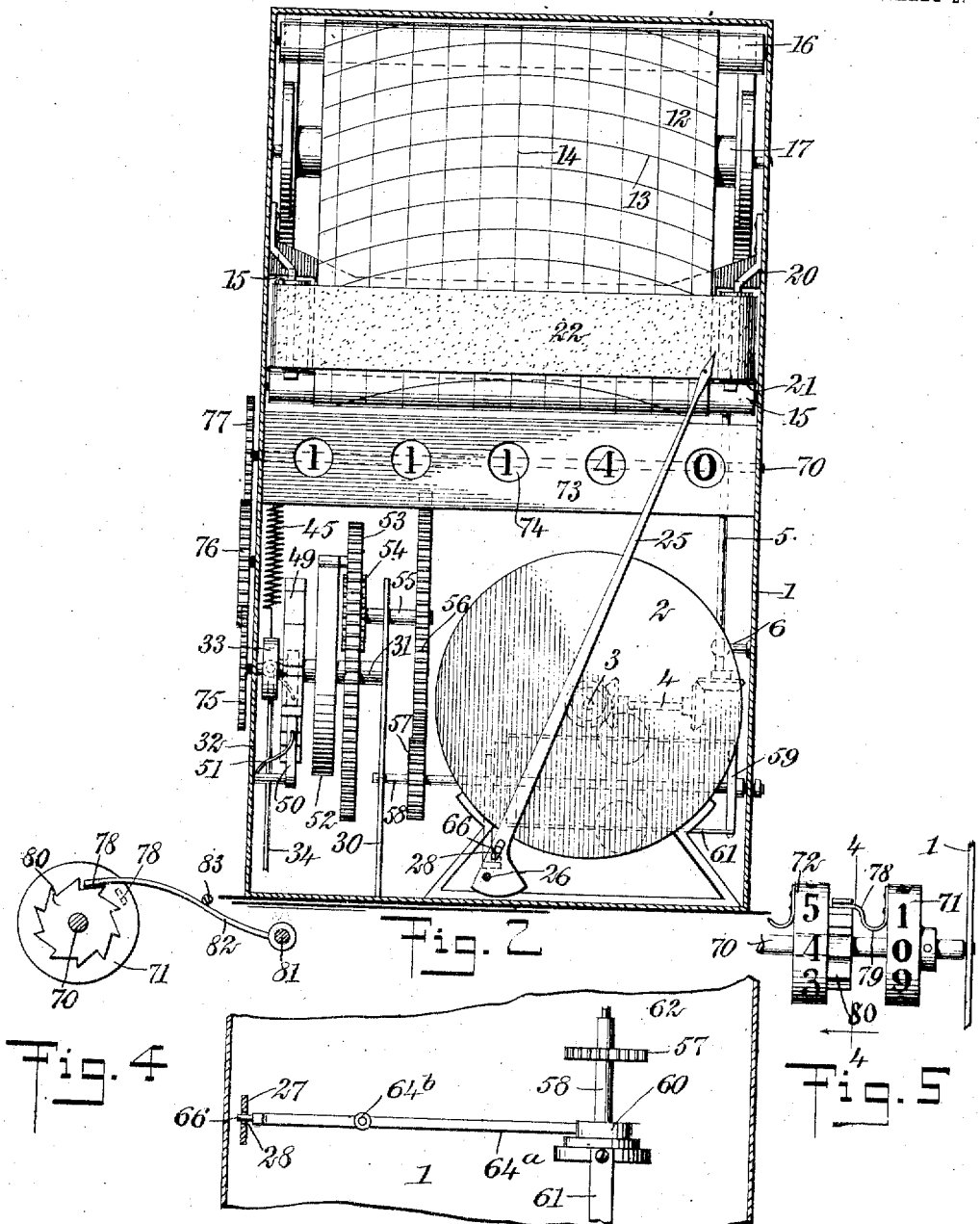

No. 859,673. PATENTED JULY 9, 1907.
G. LENNOX & R. STOTT.
SPEED RECORDER.
APPLICATION FILED APR. 11, 1906.
3 SHEETS—SHEET 3.
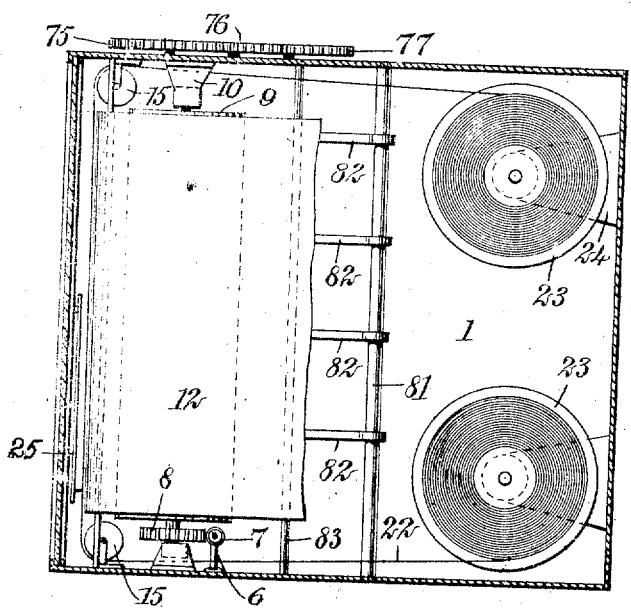
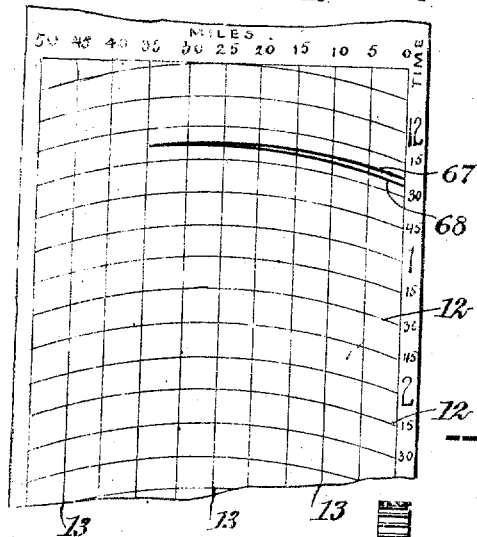
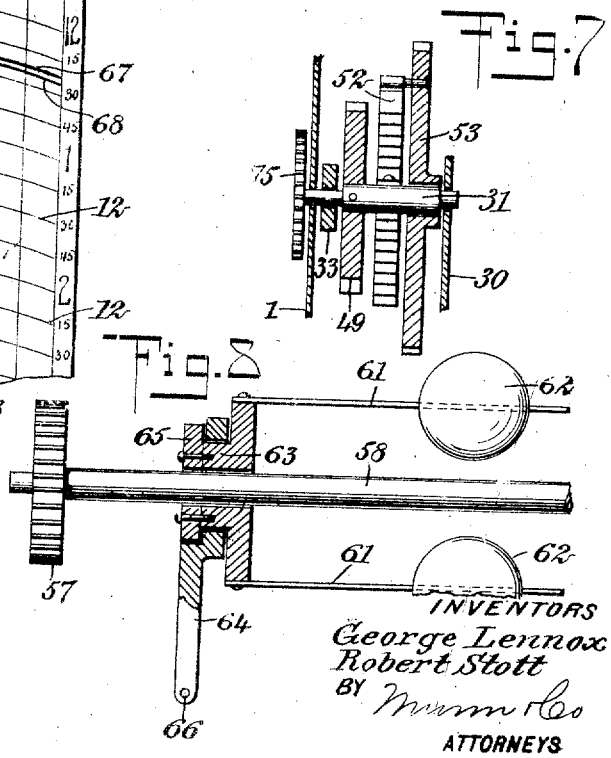
WITNESSES:
INVENTORS
George Lennox
Robert Stott
BY
ATTORNEYS

UNITED STATES PATENT OFFICE.

GEORGE LENNOX, OF HASBROUCK HEIGHTS, NEW JERSEY, AND ROBERT STOTT, OF NEW YORK, N. Y.

SPEED-RECORDER.

No. 859,673.

Specification of Letters Patent.

Patented July 9, 1907.

Application filed April 11, 1906. Serial No. 311,102.

*To all whom it may concern:*

Be it known that we, GEORGE LENNOX, a citizen of the United States, and a resident of Hasbrouck Heights, in the county of Bergen and State of New Jersey, and ROBERT STOTT, a subject of the King of Great Britain, and a resident of the city of New York, borough of the Bronx, in the county and State of New York, have invented a new and Improved Speed-Recorder, of which the following is a full, clear, and exact description.

This invention relates to speed recorders and counters, such as carried by vehicles for recording the speed thereof or the distance traveled. While the invention may be used as an attachment for any moving vehicle, it is especially useful to the users of automobiles.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a vertical section taken through the instrument and illustrating the means for driving the same; Fig. 2 is a front elevation of the instrument, the forward plate thereof being represented as removed; Fig. 3 is a section on the line 3—3 of Fig. 1 and illustrating details of construction; Fig. 4 is a section on the line 4—4 of Fig. 5 and illustrating the details of the counter; Fig. 5 is an elevation showing two adjacent wheels of the counter and illustrating the manner in which the carrying operation is effected; Fig. 6 is a cross section on the line 6—6 of Fig. 1, a portion of the recording chart being broken away; Fig. 7 is a section illustrating details of the mechanism for controlling the recording needle; Fig. 8 is a view illustrating details of the governor, certain parts being shown in section and broken away; and Fig. 9 represents a short portion of the chart or web.

Referring more particularly to the parts, and especially to Figs. 1 and 2, 1 represents a case of any suitable form. Within this case there is mounted a clock motor 2, from the main arbor 3 whereof a shaft 4 is driven, which shaft meshes with a vertical shaft 5, and this shaft is rotatably mounted in suitable bearings 6 attached to the side wall of the case, as indicated. The upper extremity of the shaft 5 is provided with a worm 7 and this worm operates through a worm wheel 8 to drive a pulley 9, which pulley is mounted in a horizontal position upon suitable brackets 10 attached to the side walls of the case as indicated. In the rear of the case and in the upper portion thereof there is mounted a supply spool 11 upon which there is wrapped a web 12 which is formed into a recording chart by means of transverse curved lines 13 and longitudinally disposed lines 14. This web is guided forwardly as indicated in Fig. 1 and passes downwardly over the face of the pulley 9. Below this point it passes about a transverse guide roller 15, from which it passes upwardly and over a second guide pulley 16 mounted in the upper portion of the case. From this guide pulley 16 it passes downwardly and rearwardly to a delivery spool 17 upon which it winds. From this arrangement it should be understood that the clock mechanism affords means for continuously advancing the web chart.

In order to wind the web upon the spool 17, the heads of the spools 11 and 17 engage each other, as shown in Fig. 1; the head 11 being of larger diameter than the head 17, it operates to give the spool 17 an increased number of revolutions, so that the web will always be maintained taut.

At a suitable point in the case and near the glass 18 which constitutes the forward wall thereof, we provide a plate 19, across the face of which the web 12 passes. To the side walls of the case, as indicated most clearly in Fig. 2, we attach brackets 20 which carry guide spools 21, and these guide spools afford means for guiding a transfer material such as an ink ribbon 22 which may be an ordinary typewriter ribbon. From this arrangement, the ribbon referred to passes transversely of the case, as will be readily understood. The body of the ribbon is wrapped upon spools or bobbins 23 which are suitably mounted at the rear of the case, as indicated most clearly in Fig. 6.
The spools 23 may be mounted on suitable brackets 24 as shown.

In the forward portion of the case we provide a recording needle 25 which normally is disposed in the position shown in Fig. 2. It is rotatably mounted at its lower extremity upon a pin 26, and is provided with a slot 28 which is disposed in a substantially radial direction from the pivot pin 26. In the upper extremity of the needle 25 a recording point or stylus 29 is attached, and the point of this stylus rests against the outer face of the ribbon 22, it being observed that the ribbon passes outside of the web 12 and across the plate 19 in a transverse direction with respect to the web.

We provide mechanism for controlling the position of the needle 25, according to the speed developed by the vehicle. For this purpose, at a suitable point in the lower portion of the case, we mount a frame plate 30, as indicated in Fig. 2; in this frame plate there is mounted a horizontal arbor 31, the outer extremity whereof is mounted in the side wall 32 of the case.

Referring now to Fig. 1, we mount rotatably upon the arbor 31, a lever 33, to the extremity whereof we attach a link 34 which extends downwardly as indicated in Fig. 1, passing through a suitable opening 35 in the body 36 of the vehicle. This link attaches at its extremity to a plunger 37 which is mounted longitudinally in the bracket 38 attached to the body of the vehicle as indicated. This bracket 38 is formed into a barrel 39 which receives a coiled spring 40, and this spring thrusts against a fixed collar 41 which is attached to the plunger near the lower extremity thereof. From this arrangement, the spring operates to hold the plunger normally in its most depressed position. The lower extremity of the plunger projected from the end of the barrel 39, and carries a roller 42, and this roller is adapted to be displaced upwardly by a cam 43 which is carried on a wheel 44 of the vehicle as indicated by broken lines in Fig. 1. The weight of the lever 33 is counterbalanced by a spring 45, the lower extremity whereof attaches to the lever, while its upper extremity is attached to a pin 46 on the side wall of the case. From this arrangement, evidently as the wheel 44 rotates, the lever 33 will be reciprocated. In this connection it should be understood that the spring 40 is of greater power than the spring 45, so that, although the spring 45 operates to assist the upward movement of the lever, it does not prevent its being returned to its pressed position when the plunger is returned by its spring. This lever 33 constitutes a pawl carrier and is provided with a pawl 47, indicated in dotted lines in Fig. 1; the said pawl being pressed by a suitable spring 48. This pawl is in engagement with a ratchet wheel 49 which is rigidly mounted on the arbor 31 referred to above. Opposite the pawl 47 a detent pawl 50 is arranged, which is pressed by a spring 51 so that it also engages the teeth of the ratchet wheel in such a way as to prevent a retrogressive movement thereof. From this arrangement it should be understood that when the pawl carrier or lever 33 moves downwardly, the pawl 47 carried thereby operates to advance the ratchet wheel. Rigidly attached to the arbor 31 a coiled or spiral spring 52 is provided, and the outer extremity of this spring is rigidly attached to the face of a gear wheel 53, which gear wheel is loosely mounted upon the arbor 31. Meshing with this gear wheel 53 there is a pinion 54 which is carried upon a rotating arbor 55, and the outer extremity of this arbor carries a gear wheel 56 which meshes with a pinion 57, the said pinion being rigidly mounted upon a governor shaft 58. This governor shaft is mounted in a horizontal position in the lower portion of the case, one extremity being carried in a side wall of the case, while the opposite extremity is rotatably mounted in the frame plate 30. On the governor shaft 58 near the side wall of the case, there is rigidly attached a cross head 59, and a similar cross head 60 is provided near the opposite end of the shaft; but this cross head 60 is loosely mounted on the shaft as indicated most clearly in Fig. 8. The arms of the cross heads 59 and 60 are connected by resilient strips or whips 61, made of light spring steel or similar material, and at a suitable point upon these whips, governor weights such as the balls 62 are carried. As indicated most clearly in Fig. 8, the cross head 60 is formed with a reduced neck 63 to which there attaches the extremity of a link 64, the said link being retained by means of a suitable collar 65 as shown.

This link depends from the governor shaft 58 as shown in Figs. 2 and 8, and it is attached to a lever 64ª pivoted at 64ᵇ and terminating in an offset pin 66 which is received in the aforesaid slot 28 in the needle 25. It should be understood that by reason of the continued rocking of the lever 33, the spring 52 will become wound up and will exert a rotative force upon the gear wheel 53. Through the gear wheels described above, this gear wheel 53 transmits a rotation at a high speed to the governor shaft 58, and evidently the speed of rotation of this governor shaft will depend upon the degree of tension existing in the spring 52; in other words, upon the speed of revolution of the wheel 44. As the speed of rotation of the governor shaft 58 is high, the centrifugal force acting upon the weights 62 will operate to throw the same outwardly, deflecting or bowing the whips 61 in a well understood manner. In this way the effective length of the whips becomes shorter so that they operate to draw the cross head 60 toward the right as viewed in Fig. 2. The link 64 moving with the cross head, operates, through the medium of the pin 66 and the slot 28, to throw the upper extremity of the needle 25 toward the left. In this way the amount of displacement of the recording stylus from the right is an index of the speed of the vehicle.

At the edge of the web, numbers are placed to correspond with the transverse curved lines 13 referred to above, and these numbers indicate hours and quarter-hours. At the end of the web numbers are placed which correspond to the divisions made by the longitudinal lines 13, each division corresponding to a speed of five miles. If the vehicle carrying the instrument is speeded up to approximately thirty-five miles, the stylus will draw a line such as the line 67 indicated in Fig. 9. As long as the speed of thirty-five miles is maintained, the recording stylus will maintain itself at substantially the thirty-five-mile line. If, however, the speed is immediately allowed to become reduced, the stylus will rule a second line 68 which will lie near the first but which will be separated therefrom by a short space indicating the time spent in making the run.

The counter 69 will now be described: As indicated in Fig. 1, it is located in the forward and substantially the middle portion of the case; it comprises a transverse horizontal shaft 70 upon which are mounted a plurality of counter wheels such as the wheels 71 and 72 illustrated in Fig. 5. Just before the wheels, a transverse face plate 73 is arranged, having openings 74 as indicated in Fig. 2, through which the numbers of the wheels are visible. The transverse shaft 70 is rotated through the medium of a gear wheel 75 which is attached to the projecting extremity of the arbor 31 as indicated most clearly in Figs. 2 and 7. This gear wheel meshes with an idler 76 which meshes, in turn, with a second gear wheel 77 which is rigidly carried by the shaft 70. With this arrangement the rotation of the arbor 31 which is produced by the reciprocation of the lever 33, rotates continuously the shaft 70. The unit wheel which is the wheel 71 located at the right in Fig. 5, is rigidly attached to the shaft 70; the other wheels are all loose. This unit wheel 71 is provided on the face which is disposed toward the wheel 72, with a dog 78, the body of which is of resilient material and bent into a bow 79. The extremity of this dog projects toward the tens wheel 72. On the face of the wheel 72 which is disposed adjacent to the wheel 71, a ratchet wheel 80 is attached, and the teeth of this ratchet wheel point in a rear direction with respect to the direction of rotation of the wheel in advancing the same. There is provided a transverse shaft 81 which carries a plurality of leaf springs 82, the extremities whereof rest respectively against the ratchet wheel 80 of the wheels, it being understood in this connection that all of the wheels except the unit wheel are provided with ratchets similar to the ratchet 80. Through the medium of a transverse bar 83, the extremity of each of the springs 82 is held down against the upper side of the corresponding ratchet wheel 80, so that these springs 82 operate as detent pawls to hold the wheels in position. The extremities of the dogs 78 are disposed just out of the reach of the teeth of the ratchet wheels, so that the dog, in approaching the co-operating leaf spring or detent pawl 82, will occupy at one instance, substantially the position in which it is indicated in dotted lines in Fig. 4. As the movement of the wheel of lower denomination progresses, the dog 78 contacts with the under side of the corresponding leaf spring 82 and is forced into the position under the end of the spring as indicated in full lines in Fig. 4. With the continued rotation of the wheel of the lower denomination, the dog 78 engages the tooth of the ratchet wheel which lies in its path and advances the wheel through one-tenth of a revolution before it releases itself from the extremity of the spring. As soon as it is released in this manner, it resumes its former position so that it will clear the points of the teeth, enabling it to rotate without further affecting the wheel. In this way the carrying from one wheel to the next is effected. In this connection it is, of course, understood that there are ten ratchet teeth on the ratchet wheels 80, corresponding to the ten numerals arranged in succession progressively, as indicated in Fig. 5 on the faces of the wheels. The proportion of the gearing is such that the numbers on the wheels will indicate miles traveled by the vehicle; thus, in Fig. 2, the counter indicates that 11140 miles have been traveled.

The mode of operation of the instrument will be briefly stated: The clock motor 2 operates through the gearing as described above, to drive continuously the pulley 9 over which passes the web 12. In this way the web is advanced continuously from the supply spool 11 to the delivery or receiving spool 17. Over the face of the web 12 the ribbon 22 is disposed. In this way, as the time passes, the web 12 is fed at a uniform rate under the point of the needle 25. As the wheel 44 reciprocates, it operates, through the medium of the plunger 37, to rock the lever 33, and this lever, through the medium of the pawl 47, winds up the spring 52 and maintains the same in a wound condition. In this way a rotative force is transmitted through the gear wheel 53 and its following train to the governor shaft 58. The governor weights which are carried by this shaft fly outwardly when the vehicle is advancing at a high speed proportionately to the speed which it has attained. In this way the link 64 operates through the lever 64ª to control the position of the needle 25. The co-operative action of the needle and the advancing web operates to draw a diagram upon the chart, indicating the speed of the vehicle at any time.

Having thus described our invention, we claim as new and desire to secure by Letters Patent:

1. In an instrument of the class described, in combination, means for advancing a web, a needle mounted to act upon said web, a governor controlling said needle, an arbor, a spring carried thereby, mechanism connecting one extremity of said spring with said governor for driving the same, a ratchet wheel carried by said arbor, a rocking lever mounted on said arbor, a pawl carried thereby engaging said ratchet wheel to wind said spring, and means for rocking said lever when the vehicle advances.

2. In an instrument of the class described, in combination, means for advancing a web, a needle mounted to act upon said web, a governor controlling said needle, an arbor, a spring carried thereby, mechanism connecting one extremity of said spring with said governor for driving the same, a ratchet wheel carried by said arbor, a rocking lever mounted on said arbor, a pawl carried thereby engaging said ratchet wheel to wind said spring, means for rocking said lever when the vehicle advances, and a detent pawl engaging said ratchet wheel.

3. In an instrument of the class described, in combination, an indicating needle, a governor connected therewith and controlling the position thereof, an arbor, a spring attached to said arbor at its inner extremity, mechanism connecting the outer extremity of said spring with said governor for driving the same, a ratchet wheel on said arbor, a rocking lever pivotally mounted on said arbor and having a pawl engaging said ratchet wheel, a link attached to said lever and adapted to be displaced by a moving part of the vehicle, and a spring attached to said lever.

4. In an instrument of the class described, in combination, an indicating needle, a governor connected therewith for controlling the same, an arbor, a spring surrounding said arbor and having its inner extremity attached thereto, a gear wheel attached to the outer extremity of said spring, a gear connecting said gear wheel with said governor for driving the same, a lever pivotally mounted on said arbor, mechanism for actuating said lever from a wheel of the vehicle a ratchet wheel carried by said arbor, and a pawl carried by said lever for actuating said ratchet wheel.

5. In an instrument of the class described, in combination, a needle, a rocking lever, mechanism between said rocking lever and said needle for controlling said needle, a spring attached to said lever and tending to force the same toward an extreme position, a plunger connected with said lever and adapted to be engaged by a wheel of the vehicle, and a spring constraining said plunger and opposing said first spring.

In testimony whereof we have signed our names to this specification in the presence of two subscribing witnesses.

GEORGE LENNOX.
ROBERT STOTT.

Witnesses:
HENRY HALLERITH,
WILLIAM NORMAN.